May 15, 1934.   W. A. REASER ET AL   1,958,800
DRAIN PLUG
Filed Feb. 7, 1933
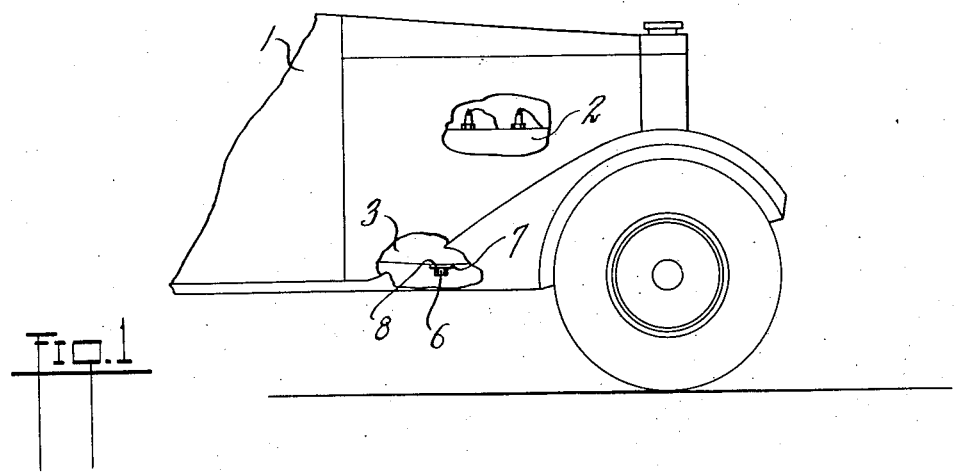
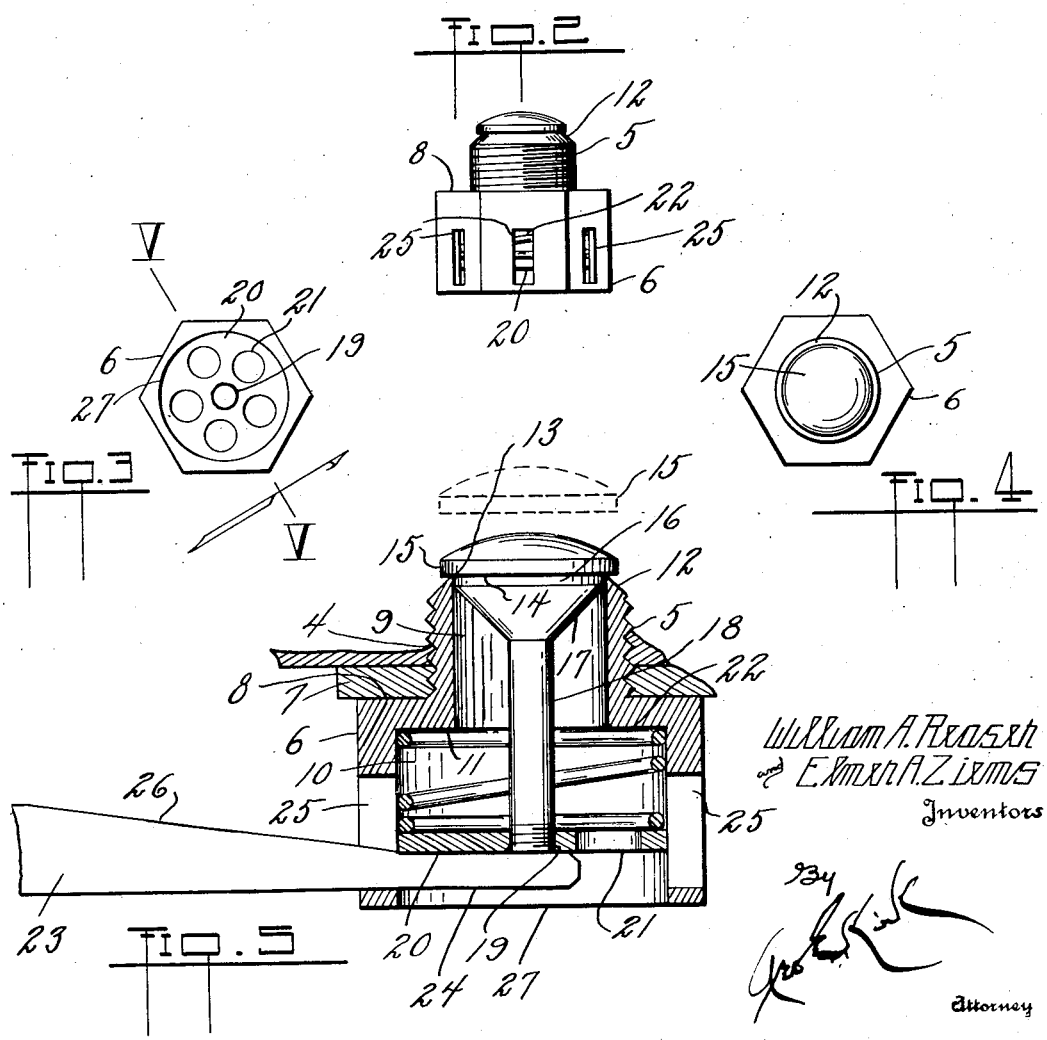

Patented May 15, 1934

1,958,800

UNITED STATES PATENT OFFICE 1,958,800

DRAIN PLUG

William A. Reaser and Elmer A. Ziems,
Toledo, Ohio

Application February 7, 1933, Serial No. 655,658

3 Claims. (Cl. 137—34)

This invention relates to ported plugs.

This invention has utility when incorporated in drain plugs as for the crank cases of internal combustion engines, say of automobiles, when such crank cases are utilized as lubricant reservoirs, which plug, without removal thereof, may be readily controlled for out-flow of liquid and for liquid tight closing.

Referring to the drawing:

Fig. 1 is a fragmentary view of a motor vehicle having the crank case of its internal combustion motor equipped with an embodiment of the device herein;

Fig. 2 is a side elevation, on an enlarged scale, of the device in closed position;

Fig. 3 is a bottom plan view of the device of Fig. 2;

Fig. 4 is a top plan view of the device of Fig. 2; and

Fig. 5 is a section on the line V—V, Fig. 3.

Motor vehicle 1 is shown equipped with internal combustion engine 2 having crank case 3 provided with bottom opening 4 in which may be entered externally threaded section 5 of a drain plug. This section 5 of the drain plug has polygonal section 6 projecting therefrom and of larger diameter. The plane faces in diametrical relation afford ready gripping portions for a wrench to seat the plug in snug position in the opening 4 and sealing at gasket 7 abutting shoulder 8.

This plug has a central passage therethrough embodying cylindrical minor diameter section 9 in the portion 5, and cylindrical major diameter section 10 in the portion 6. These passage portions 9, 10, have shoulder 11 at the junction therebetween opposing the external shoulder 8.

The externally threaded portion 5, remote from the shoulder 11, has tapered portion 12 to narrow circular seat 13 which determines a plane and may have a very minor radial extent. Opposing this seat is seat 14 of disk 15 having smaller diameter center portion 16, tapered portion 17 to central stem 18 extending through the passage portion 9 into the passage portion 10 and there having threaded and rivet connection 19 with ledge 20, herein shown as of general disk form having a plurality of openings 21 of capacity not less than the capacity of the passage 9. Helical compression spring 22 between the shoulder 11 and the ledge 20 serves to hold the seat 14 against the seat 13 at the inner entrance of the passage 9. The minor extent area of the seat 13 coupled with the strength for effecting seating by the spring 22 insures snug non-leak closure of this drain plug.

To effect removal of a portion of the contents of the crank case 3 or full draining thereof, it is not necessary for the one so acting to become smeared with the lubricant, for it is only necessary to take tool 23 which comprises wedge means, thrust its narrow terminal portion 24 through one of the slots 25 in the face of the polygonal portion 6 and urge such tool diametrically across the passage portion 10, even to the extent that this portion 24 may enter the diametrically opposite slot 25.

In this shifting of the tool 23, wedge or bevelled portion 26 rides against the lower side of the ledge 20 and thrusts such away from bottom opening 27 of the plug and thereby lifts the disk 15 away from the seat 13, so that there may be freedom for flow from the crank case 3. The operator of the tool 23 is thus laterally away from the passage opening 27 and the flow of the lubricant does not in anywise tend to smear the one effecting the draining.

As the full draining or desired quantity of liquid removal is effected, it is only necessary to withdraw the tool 23 and the spring 22 is active for effecting tight closure of this valve device in this ported drain plug.

What is claimed and it is desired to secure by Letters Patent is:

1. A drain plug comprising a body having a threaded portion and a polygonal portion, an axial passage therethrough being of reduced diameter through the threaded portion and providing a shoulder intermediate the passage length, said body at the threaded portion being tapered to a terminal knife edge seat, a closure for said plug comprising a disk providing a face to coact against the knife edge seat, a cylindrical portion extending from said disk of approximate passage diameter coaxial with the passage, a ledge carried by the stem in the passage through the polygonal portion remote from the disk, and a spring between said ledge and shoulder.

2. A drain plug comprising a body having a threaded portion and a polygonal portion, an axial passage therethrough being of reduced diameter through the threaded portion and providing a shoulder intermediate the passage length, said body at the threaded portion being tapered to a terminal knife edge seat, a closure for said plug comprising a face to coact against the knife edge seat, said closure having a conical portion extending into the passage to provide proper closure and seat coaction, said conical portion merging into a stem extending coaxial with the passage, said stem carrying a ledge remote from the conical portion, and a spring between said ledge and shoulder.

3. A drain plug comprising a body having a threaded portion and a polygonal portion, an axial passage therethrough being of reduced diameter through the threaded portion and providing a shoulder intermediate the passage length, said body at the threaded portion being tapered to a terminal knife edge seat, a closure for said plug comprising a disk providing a knife seat coacting face, a stem from said disk extending coaxial through the passage, a disk shaped ledge carried by the stem remote from the disk, said ledge slidable in the passage extending through the polygonal portion and provided with openings therethrough with a total capacity of at least as great as the reduced diameter portion of the passage, and a spring between said ledge and shoulder.

WILLIAM A. REASER.
ELMER A. ZIEMS.